US006851726B2

(12) United States Patent
Minemyer

(10) Patent No.: US 6,851,726 B2
(45) Date of Patent: Feb. 8, 2005

(54) RADIAL CONDUIT COUPLING SYSTEM AND METHOD

(76) Inventor: John T. Minemyer, 4620 Enchanted Cir. N, Colorado Springs, CO (US) 80917-3108

( * ) Notice: Subject to any disclaimer, the term of this patent is extended or adjusted under 35 U.S.C. 154(b) by 0 days.

(21) Appl. No.: 10/328,079

(22) Filed: Dec. 23, 2002

(65) Prior Publication Data

US 2003/0098584 A1 May 29, 2003

Related U.S. Application Data

(63) Continuation of application No. 09/379,550, filed on Aug. 23, 1999, now Pat. No. 6,499,772.
(60) Provisional application No. 60/097,868, filed on Aug. 25, 1998.

(51) Int. Cl.[7] ................................................ F16L 21/06
(52) U.S. Cl. ......................... 285/322; 285/319; 285/39; 285/308
(58) Field of Search .............................. 285/40, 29, 24, 285/39, 81, 84, 85, 86, 358, 308, 322, 324, 314, 319, 93

(56) References Cited

U.S. PATENT DOCUMENTS

| | | | |
|---|---|---|---|
| 1,463,749 A | 7/1923 | Pollak | |
| 2,073,338 A | 3/1937 | Durkee | |
| 2,346,051 A | 4/1944 | Seamark | |
| 3,078,108 A | 2/1963 | Smith | |
| 3,133,753 A | 5/1964 | Goodman et al. | |
| 3,186,744 A | 6/1965 | Smith et al. | |
| 3,776,579 A | 12/1973 | Gale | |
| 3,790,194 A | 2/1974 | Kimberley | |
| 4,236,736 A | 12/1980 | Anderson | |
| 4,275,907 A | * 6/1981 | Hunt | 285/319 |
| 4,352,512 A | 10/1982 | Janssen et al. | |
| 4,407,527 A | * 10/1983 | Reimert | 285/27 |
| 4,417,755 A | 11/1983 | Gittleman | |

(List continued on next page.)

FOREIGN PATENT DOCUMENTS

| | | |
|---|---|---|
| AT | 222956 | 8/1962 |
| DE | 139631 | 1/1980 |
| DE | 41 11 952 C | 4/1992 |
| EP | 0650 007 A | 4/1995 |
| EP | 0 916 888 A | 5/1999 |
| EP | 0 997 678 A | 5/2000 |
| FR | 873844 | 7/1942 |
| GB | 2098692 | 11/1982 |
| IT | 261684 | 12/1928 |
| WO | WO 00 11390 A | 3/2000 |

OTHER PUBLICATIONS

Lözon Solutions brochure.
Lözon Solutions, "SealLock™ Couplers".

*Primary Examiner*—Eric K. Nicholson
*Assistant Examiner*—Aaron Dunwoody
(74) *Attorney, Agent, or Firm*—Baker Botts L.L.P.

(57) ABSTRACT

A radial conduit coupling is provided. The conduit coupling may include a tubular first connector having an exterior diameter, an interior diameter and first and second ends. The first end may be adapted to receive a first conduit. The second end may include at least one locking lug configured to cooperate with at least one shaped cavity associated with a component of a conduit system. The locking lug may extend from at least one tab lock disposed at the second end of the first connector. In one embodiment, a protrusion may extend from the interior diameter and generally separate the first end from the second end. The protrusion may include an interior diameter which generally corresponds to the interior diameter of the first conduit. A sealing surface may be disposed between the protrusion and the locking lug, and the sealing surface may be configured to cooperate with the second sealing surface associated with a second connector to form a generally fluid tight seal between the first connector and the second connector.

18 Claims, 8 Drawing Sheets

U.S. PATENT DOCUMENTS

| | | | |
|---|---|---|---|
| 4,611,835 A | | 9/1986 | Gittleman |
| 4,708,375 A | | 11/1987 | Sauer |
| 4,850,622 A | | 7/1989 | Suzuki |
| 4,923,349 A | | 5/1990 | Logsdon |
| 5,004,275 A | | 4/1991 | Miller |
| 5,029,904 A | * | 7/1991 | Hunt .......................... 285/319 |
| 5,113,900 A | * | 5/1992 | Gilbert ....................... 285/319 |
| 5,120,083 A | | 6/1992 | Stine |
| 5,141,258 A | | 8/1992 | Stine |
| 5,234,234 A | | 8/1993 | Hearn |
| 5,286,067 A | * | 2/1994 | Choksi ........................ 285/93 |
| 5,324,150 A | | 6/1994 | Fullerton |
| 5,415,441 A | * | 5/1995 | Kilgore et al. ............... 285/322 |
| 5,451,031 A | * | 9/1995 | Purvis et al. ................. 285/93 |
| 5,605,357 A | | 2/1997 | Bird |
| 5,709,417 A | | 1/1998 | Verbeck |
| 5,775,741 A | | 7/1998 | Rice et al. |
| 5,833,276 A | | 11/1998 | Thompson, Jr. |
| 6,059,321 A | | 5/2000 | Lyall |
| 6,276,726 B1 | | 8/2001 | Daspit |
| 6,499,772 B1 | * | 12/2002 | Minemyer .................. 285/322 |

* cited by examiner

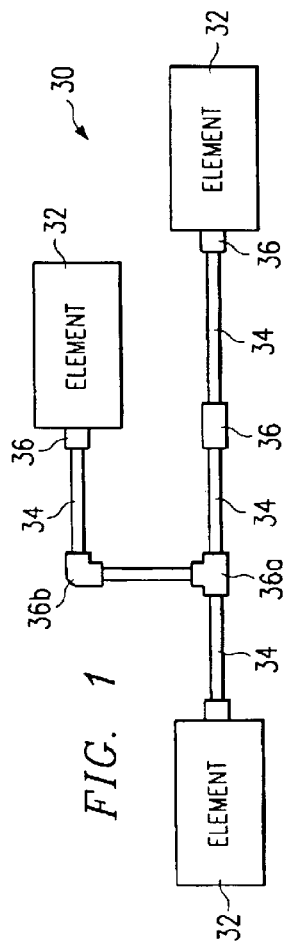
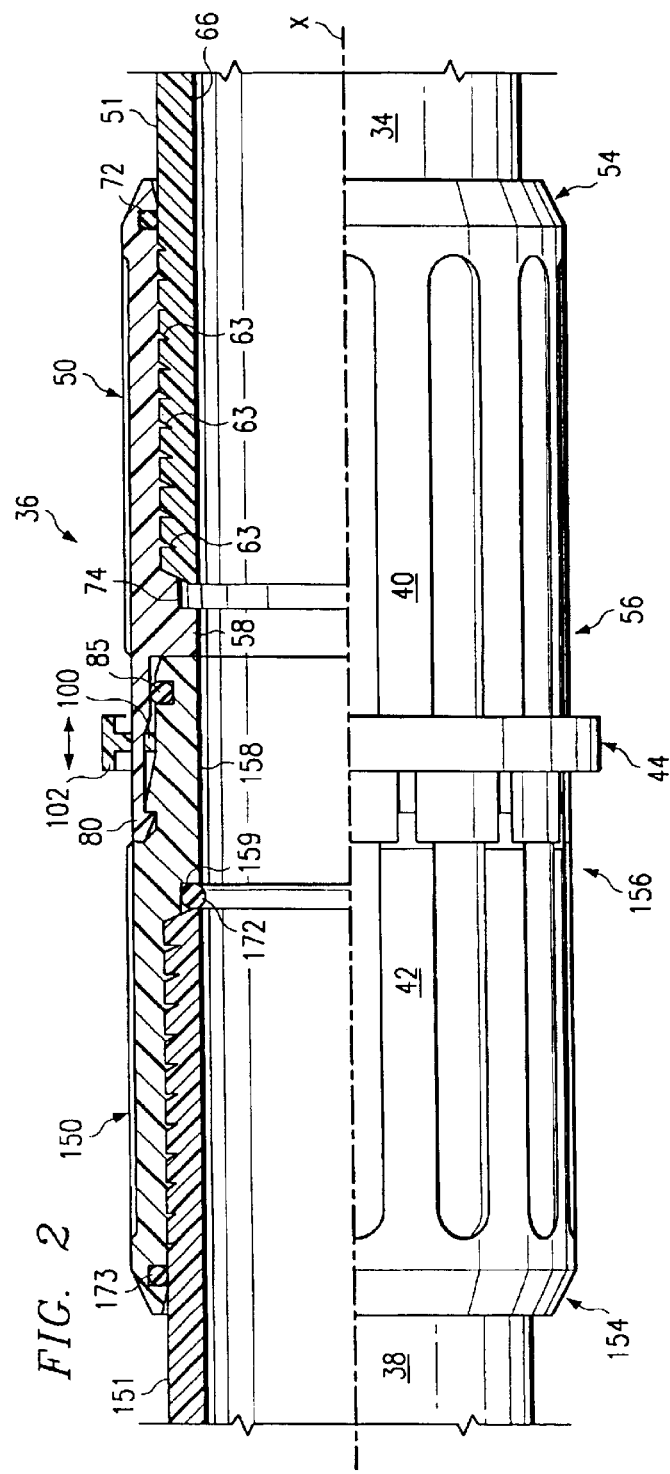

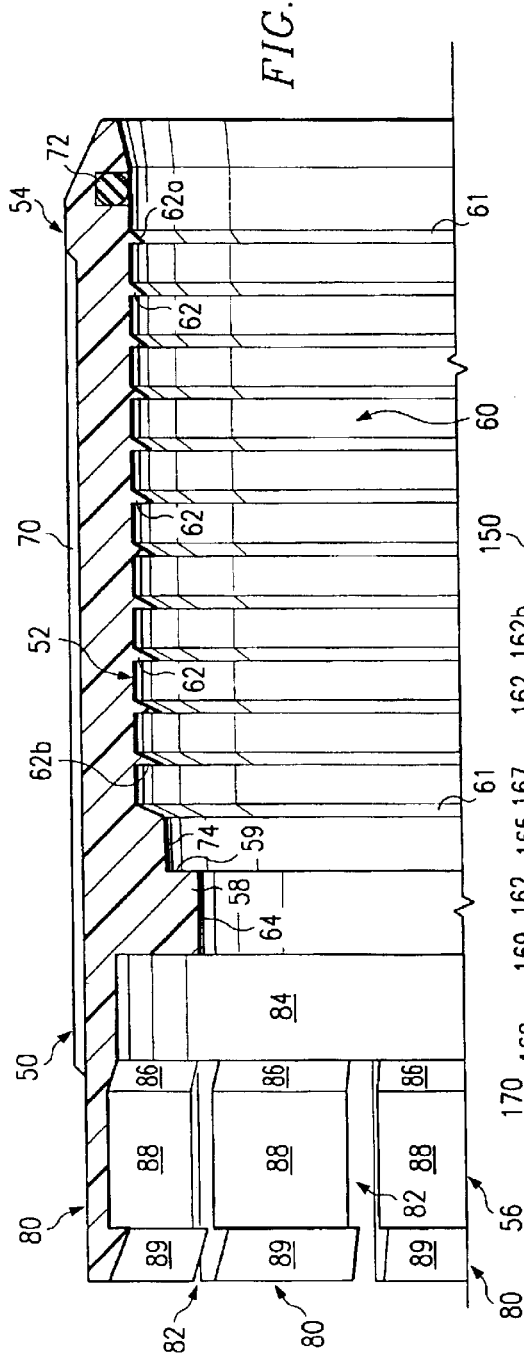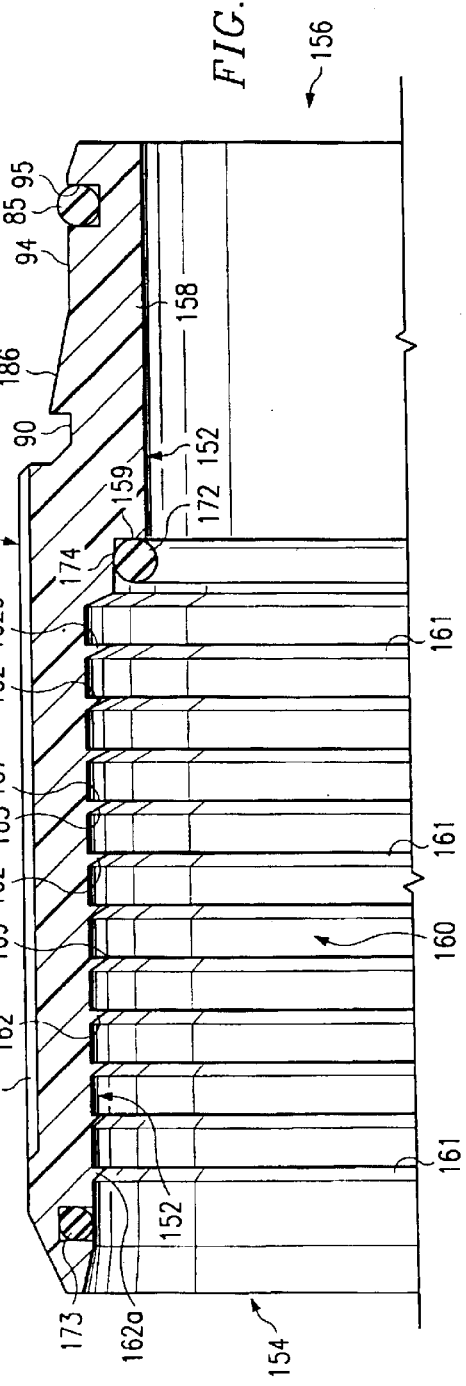

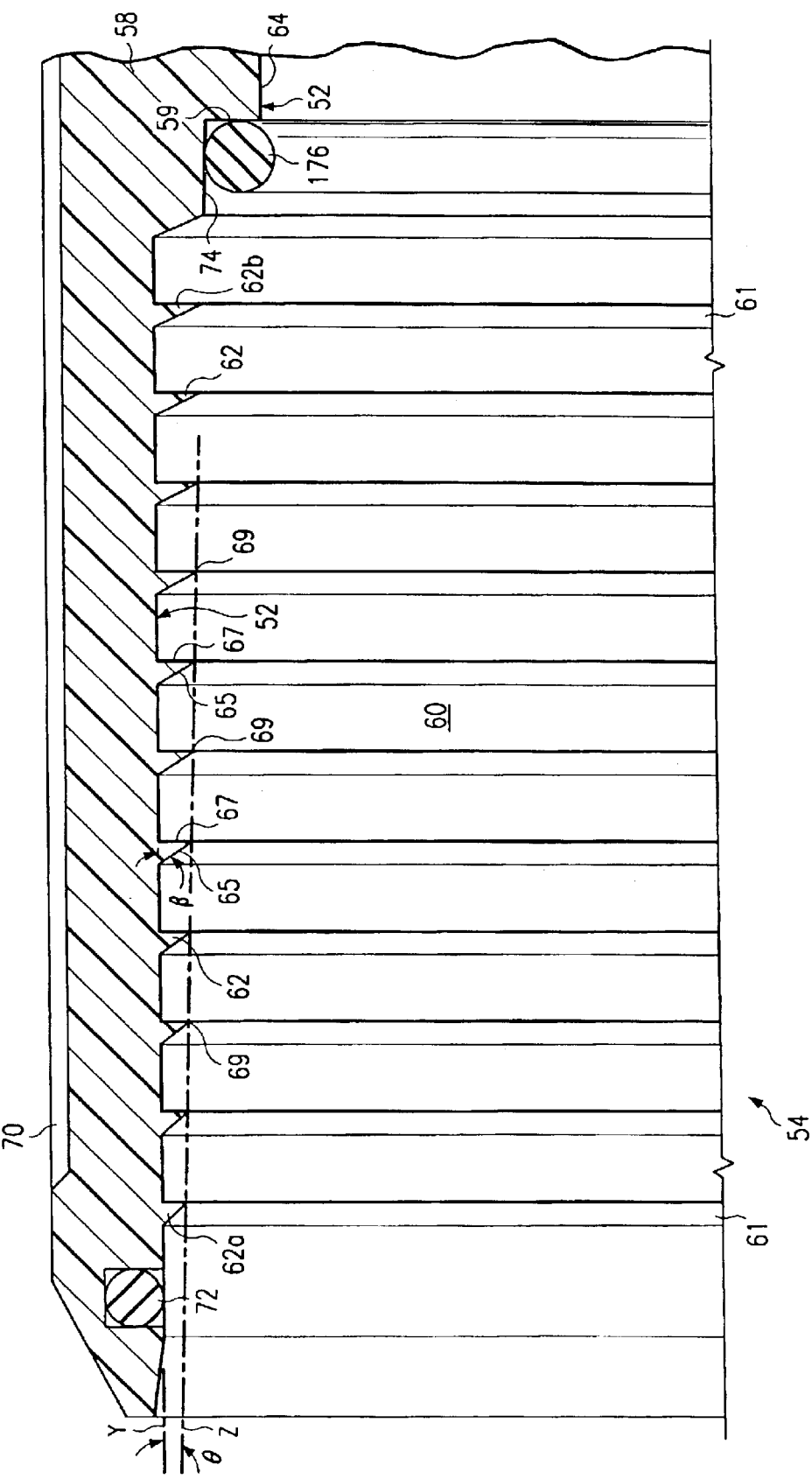

RADIAL CONDUIT COUPLING SYSTEM AND METHOD

RELATED PATENT APPLICATION

This Application is a continuation of U.S. application Ser. No. 09/379,550 filed Aug. 23, 1999 now U.S. Pat. No. 6,499,772 entitled Radial Conduit Coupling System and Method, which claims the benefit of U.S. Provisional Application Ser. No. 60/097,868 entitled Radial Conduit Coupling, filed Aug. 25, 1998.

TECHNICAL FIELD OF THE INVENTION

The present invention relates generally to pipe fittings, and more particularly to a radial conduit coupling system and method.

BACKGROUND OF THE INVENTION

Conduit systems are used in a number of industries and applications to form a passage for communicating a media. For example, conduit systems are utilized in water and sewage pluming systems; electrical wire and optic fiber conduit systems; hydraulic and pneumatic systems; as well as other devices and systems. The conduit system generally comprises a number of pipes that are connected together, or assembled, to form the conduit system. The pipe is often constructed from a plastic, such as rigid or plasticize polyvinylchloride (PVC), and polyethylene. The pipe may be rigid or flexible, and is generally formed in relatively short lengths that must be joined together.

In many applications, a pipe coupling is used to join the pipes. Pipe couplings can be permanent or detachable. Permanent pipe couplings are often bonded to the respective ends of the pipe. Detachable pipe couplings include complementary male and female connectors that are coupled to the respective ends of the pipe.

Conventional pipe couplings have several disadvantages. May piping systems are "welded" together through a process called electrofusion. This is an expensive and time-consuming operation with many drawbacks. For instance, the melting point associated with different lengths of pipe may vary considerably thereby hindering the welding operation. Accordingly, skilled artisans are required to assemble piping components. Accordingly, the process must be adjusted continually as ambient temperate changes.

Aluminum compression fittings are also available for joining adjacent sections of pipe. Aluminum fittings often compress the pipe beyond an acceptable range restricting the inner diameter of the pipe. Aluminum fittings are also subject to corrosion when placed adjacent to alkaline soils.

Conventional pipe couplings are difficult to assemble and prone to failure. In addition, many conventional pipe couplings do not form a tight seal between the pipe and the outside environment, thereby allowing the media to escape to the outside environment, or allowing the outside environment to contaminate the media. In general, conventional pipe couplings are difficult to install and assemble, thereby requiring expensive skilled artisans to construct the conduit system.

SUMMARY OF THE INVENTION

Accordingly, a need has arisen in the art for a radial conduit coupling. The present invention provides a radial conduit coupling that substantially reduces or eliminates problems associated with prior conduit coupling systems and methods.

In accordance with one embodiment of the present invention, a radial conduit coupling is provided. The conduit coupling may include a tubular first connector having an exterior diameter, an interior diameter and first and second ends. The first end may be adapted to receive a first conduit. The second end may include at least one locking lug configured to cooperate with at least one shaped cavity associated with a component of a conduit system. The locking lug may extend from at least one tab lock disposed at the second end of the first connector.

In one embodiment, a protrusion may extend from the interior diameter and generally separate the first end from the second end. The protrusion may include an interior diameter which generally corresponds to the interior diameter of the first conduit. A sealing surface may be disposed between the protrusion and the locking lug, and the sealing surface may be configured to cooperate with the second sealing surface associated with a second connector to form a generally fluid tight seal between the first connector and the second connector.

In another embodiment, the tab lock may also include a tapered surface disposed between the sealing surface and the locking lug. The tapered surface may operate to provide radial flexibility to the tab block. In yet another embodiment, a plurality of flutes may be disposed upon the exterior diameter of the first connector. The flutes may extend generally parallel with a central axis of the first connector to provide a gripping surface for installing the first connector upon a component of a conduit system.

In yet another embodiment, the conduit coupling may include a second connector having first and second ends, and an interior diameter generally corresponding to an exterior diameter of a second conduit. A second threaded portion may be disposed upon the interior diameter of the second connector adjacent its first end, and operable to releasably couple the second connector and the second conduit. The second connector may include at least one shaped cavity configured to cooperate with the tab lock associated with the first connector, and operable to releasably couple the first and second connectors.

In still another embodiment, the conduit coupling may also include a cylindrical, tubular unlocking mechanism having an inner ring, an outer ring, and a plurality of radial braces coupling the inner ring and the outer ring. The outer ring may have an interior diameter approximately equal to and larger than the exterior diameter of the first connector. A plurality of slots associated with the first connector may be configured to receive the radial braces such that the inner ring may be installed between the exterior diameter of the second connector and the interior diameter of the first connector. The inner ring may be operable to dislodge the locking lug from the shaped cavity as the outer ring is forced laterally along the exterior diameter of the first connector, toward the locking lug.

The present invention provides several technical advantages. For example, a specific angular orientation of the first and second connectors is not required to assemble the conduit coupling. Accordingly, the conduit coupling can be easily assembled and disassembled without a high degree of skill.

Another technical advantage of the present invention is that the plurality of locking tabs engage the locking feature over a large circumferential area, thereby reducing the stress in each locking tab. Accordingly, the radial conduit coupling has greater reliability and can withstand higher pressures and stresses.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like features, in which:

FIG. 1 is a schematic drawing of a conduit system including radial conduit couplings in accordance with the teachings of the present invention;

FIG. 2 is a schematic drawing in section, with portions broken away, illustrating one embodiment of the radial conduit coupling of FIG. 1, in accordance with the teachings of the present invention;

FIG. 2A is a partial cross-section, with portions broken away, illustrating portions of a first connector of the conduit coupling of FIG. 2;

FIG. 2B is a partial cross-section, with portions broken away, illustrating portions of a second connector of the conduit coupling of FIG. 2;

FIG. 2C is a partial cross-section, with portions broken away, illustrating portions of the first connector of FIG. 2A;

DETAILED DESCRIPTION OF THE INVENTION

Figure 2D:
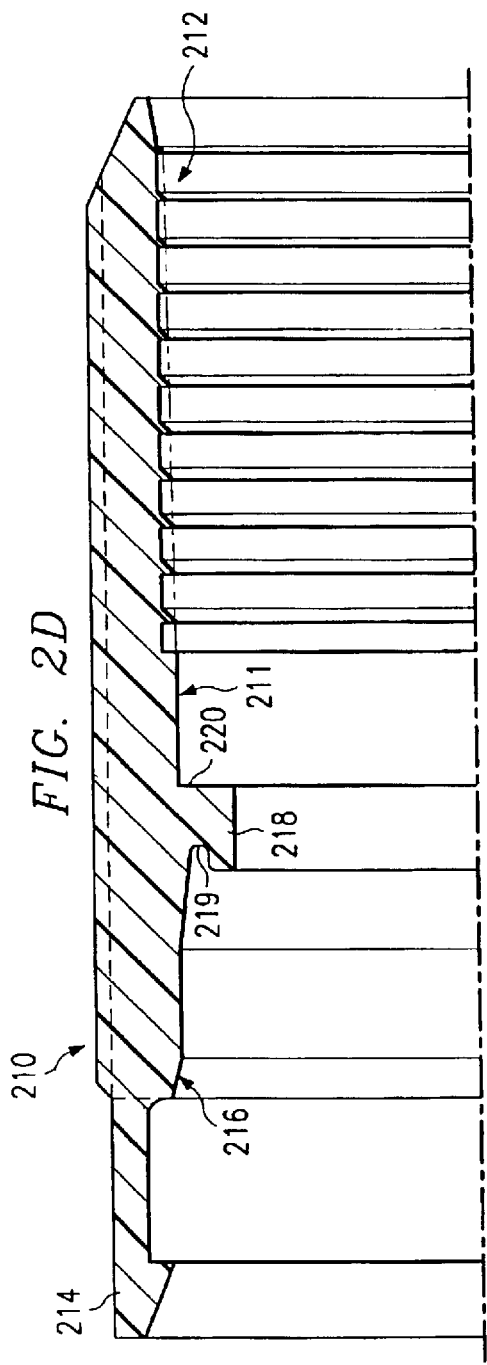
FIG. 2D is a partial cross-section, with portions broken away, of an alternative embodiment connector.

The preferred embodiments of the present invention and its advantages are best understood by referring now in more detail to FIGS. 1–8 of the drawings, in which like numerals refer to like parts.

FIG. 1 is a schematic drawing illustrating a simplified conduit system, generally designated by the reference numeral 30. Conduit system 30 includes a number of elements 32 which communicate through various sections of pipe or conduit 34. Conduit couplings 36 form the transition between elements 32 and conduits 34. Each conduit 34 typically includes a smooth, constant diameter exterior perimeter. The connection between conduit 34 and couplings 36 may be formed with mechanical couplings, adhesives, slip-fit, friction-fit, or electrofusion, wherein couplings 36 and conduit 34 are heated and melted together.

In one embodiment, conduit system 30 may form the interconnection between various elements of a telecommunications system. Accordingly, various components including copper wire, twisted pairs, coaxial cable, and fiber optics may be incorporated into conduit system 30. Conduit 34 may include inner duct, outer duct, or any combination thereof. Typically, outer duct refers to a conduit which carries one or more conduits or other medium therein. Inner duct refers to conduit and couplings carried within the outer duct. The teachings of the present invention are applicable to both inner and outer duct systems.

In practice, conduit system 30 may include any system provided for protection of any medium carried therein. Furthermore, conduit system 30 may be specifically designed to carry any solid medium as well as fluids, including liquids and gases. Conduit system 30 may maintain ambient pressure, or include a pressurized medium, for example, a pressurized fire protection system for distributing water or fire resistant chemicals. In another embodiment, conduit system 30 may be designed for gravity flow systems, including waste water distribution and disposal.

Conduits 34 and couplings 36 may include any type of pipe-grade metal, plastic, or composite material. Examples include polyvinylchloride (PVC), high density polyethylene (HDPE), and glass-filled HDPE. Various metal conduit materials are also available and include aluminum, copper, carbon-steel and various other metal alloys.

A conduit coupling 36 suitable for joining lengths of conduit 34 and 38 is illustrated in more detail in FIG. 2. Conduit coupling 36 comprises a first female connector 40 releasable coupled with a second male connector 42. An unlocking mechanism 44 is disposed around the perimeter of female connector 40 to facilitate simplified de-coupling of female connector 40 from male connector 42. In the illustrated embodiment, components of conduit coupling 36 may be fabricated from an acetal copolymer, or other high modulus plastic material. Other materials suitable for use in the fabrication of components of conduit coupling 36 include plastics, such as rigid or plasticized PVC, polyethylene, and HDPE. Components of conduit coupling 36 may also be fabricated from various other plastics, metals, and composites, within the teachings of the present invention.

Partial cross sections of female connector 40, with portions broken away, are illustrated in more detail in FIGS. 2 and 2A. Female connector 40 generally comprises an elongate, cylindrical, tubular configuration, having an exterior diameter 50, interior diameter 52, and first and second ends 54 and 56, respectively. The respective profiles of interior diameter 52 and exterior diameter 50 vary along the longitudinal length of female connector 40. A protrusion 58 extending from interior diameter 52 generally separates first end 54 from second end 56.

First end 54 of female connector 40 is adapted to receive, and may be coupled with a length of conduit 34, at a threaded portion 60 of first end 54. Interior diameter 52 generally corresponds with exterior diameter 51 at first end 54. Male connector 42 also includes a threaded portion 160 (FIG. 2B) configured similarly to threaded portion 160. For illustrative purposes, threaded portion 60 is illustrated and described in more detail with regard to FIG. 2C. It will be recognized that the description of FIG. 2C pertains to threaded portion 160 of first end 154 of male connector 42 as well.

In the illustrated embodiment of FIG. 2C, threaded portion 60 comprises a single continuous thread 61 which forms a plurality of teeth 62 along the interior diameter 52 of female connector 40. Alternatively, the threaded portion may include one or more additional threads which cooperate with thread 61 to form a double lead thread, or triple lead thread.

In another embodiment, thread 61 forming teeth 62 need not be a continuous thread. For example, one or more circular ribs disposed along the interior diameter 52 of female connector 40 may form one or more teeth which may have a similar configuration to teeth 62. In this manner, female connector 40 may be "press-fit" onto conduit 34 and teeth 62 may function to bite or grab conduit 34, preventing the de-coupling of female connector 40 from conduit 34. This type of fastening of female connector 40 upon conduit 34 may be referred to as a friction fit. Similarly, teeth 62 may be completely absent from interior diameter 52. In order to join female connector 40 with conduit 34 in this embodiment, a gasket 72 may be disposed upon exterior diameter 51 of conduit 34, and female connector 40 may be press-fit upon conduit 34.

Many methods are available for joining female connector 40 and/or male connector 42 with conduits 34 and 38, respectively. For example, female connector 40 and/or conduit 34 may be threaded, as in the illustrated embodiment of FIG. 2. Alternatively, as previously discussed, one or more ribs may be disposed about interior diameter 52 to cooperate with exterior diameter 51 of conduit 34 to form a seal therebetween. One or more grooves may also be disposed about the exterior diameter 51 of conduit 34 in order to enhance the seal. In yet another embodiment, interior diameter 52 may be slightly oversized with respect to exterior diameter 51 and a standard press-fit may be employed. In this embodiment, teeth 62 and/or grooves would not be required. In yet another embodiment, an adhesive may be used to form the coupling between female connector 40 and conduit 34. Regardless of the method employed for joining female connector 40 with conduit 34, gasket 72 may be installed between interior diameter 52 and exterior diameter 51 to enhance the fluid tight seal therebetween, and increase the strength of the connection. This embodiment may be referred to as a "slip-fit" type connection. Accordingly, thread 61, teeth 62, grooves and/or gasket 72 are not required for any particular application, within the teachings of the present invention.

Female connector 40, of the present invention, may be installed upon conduit 34 by inserting conduit 34 at least partially within first end 54 and rotating female connector 40 about a central axis X of conduit 34, in a direction opposite of thread 61. Although conduit 34 may be initially provided with a smooth, constant diameter, exterior diameter 51, thread 61 operates to form a plurality of grooves 63 corresponding to teeth 62, upon exterior diameter 51. As female connector 40 is rotated, a releasable coupling is formed between conduit 34 and female connector 40. Female connector 40 may be rotated by hand, with a conventional wrench, or using a special socket wrench, specifically modified for installing female connector 40 upon conduit 34.

Protrusion 58 includes a barrier, or dead stop 59 which cooperates with conduit 34 to prevent the lateral movement of conduit 34, with respect to female connector 40, beyond first end 54 of female connector 40. Contact between conduit 34 and dead stop 59 prevents further rotation of female connector 40 and indicates that female connector 40 is properly installed upon conduit 34. A practitioner may view interior diameter 52 through second end 56, to ensure the proper installation of female connector 40 upon conduit 34 and verify that no obstructions, or burrs are present. Protrusion 58 also includes an interior diameter 64 approximately equal to an interior diameter 66 of conduit 34. This ensures continuity between conduit 34 and female connector 40 and prevents any rough edges, gaps, or other obstructions from forming which may prevent proper communication of any medium through conduit 34 to conduit 38. Protrusion 58 also provides a portion of increased radial thickness upon female connector 40. This increases the overall strength of female connector 40, and prevents failure caused by fracture or cracking of the component parts. This is particularly beneficial when conduit coupling 36 comprises plastic and/or composite material.

A pipe seal, or gasket 72 may also be provided along interior diameter 52 of female connector 40. Gasket 72 may be compressed between exterior diameter 51 and interior diameter 52 in order to ensure a proper seal between conduit 34 and female connector 40. This prevents any media contained within conduit 34 from escaping to the ambient environment, and also prevents ambient contaminants from entering conduit system 30. A proper seal between conduit 34 and female connector 40 is beneficial for any application requiring pressure differentials between the interior of conduit system 30 and ambient environment. For example, in order to install fiber optic cables (not expressly shown) within conduits 34 and 38, conduit 34 may be pressurized as fiber optic cables are blown through.

Materials used to fabricate gasket 72 may be selected according to specific criteria, including their resistance to chemical and ultraviolet exposure. In the illustrated embodiment, gasket 72 may be fabricated from silicon. Many other materials may be used to fabricate gasket 72, including various elastomeric and/or compressible materials.

As previously discussed, a special tool may be used to form the coupling between female connector 40 and conduit 34. To accommodate this application, a plurality of flutes 70 are disposed upon exterior diameter 50 of female connector 40. Flutes 70 may include elongate depressions within exterior diameter 50 and extending in a director parallel to central axis X. Accordingly, a socket-type wrench with protrusions corresponding with flutes 70 may be used for installation of female connector 40 upon conduit 34. Alternatively, flutes 70 also provide a gripable surface for installation by hand. In another embodiment, a standard wrench, for example a pipe wrench, may be used to grip flutes 70 for proper installation.

Conduit 34, and therefore, connectors 40 and 42, may be provided in a variety of different sizes, within the teachings of the present invention. For example only, and not by way of limitation, for applications in which conduit 34 forms an inner duct, typical sizes include 1¼ inch, 1½ inch, and two inch diameter sections. For applications where conduit 34 serves as an outer duct, typical sizes include four to twelve inch outer diameter sections.

Referring again to FIG. 2C, thread 61 may be referred to as a "modified buttress thread." Each tooth 62 includes a sharp point 69 operable to effectively engage conduit 34. Each tooth 62 is configured to have a front face 65 which forms a greater angle with respect to an axis Y, drawn through the base of each tooth 62, than does rear face 67. Rear face 67 extends generally perpendicular to axis Y. Conversely, front face 65 extends at an angle β with respect to axis Y. In one embodiment, β may be greater than five degrees, for example, approximately equal to thirty degrees. This is particularly useful in an application in which female connector 40 is press-fit upon conduit 34, since sharp point 69 and the configuration of front face 65 and rear face 67 allow a tighter grip of female connector 40 upon conduit 34. The modified buttress thread also resists the unscrewing of female connection 40 from conduit 34. This feature also enables female connector 40 to exhibit "self-tapping" characteristics. Accordingly, sharp point 69 of tooth 62 cuts exterior diameter 51 of conduit 34 and creates the threaded profile, or grooves 63 upon exterior perimeter 51 during installation of female connector 40 upon conduit 34.

Thread 61 may also include a tapered configuration as illustrated in FIG. 2C. Accordingly, the first tooth 62a along threaded portion 60 may be smaller and protrude less dramatically from interior diameter 52, than does the last tooth 62b. This feature provides greater surface area contact between female connector 40 and conduit 34, and exhibits a self-sealing characteristic which provides a stronger connection therebetween. In one embodiment, an axis Z from the sharp point 69 of tooth 62a to the sharp point 69 of tooth 62b may form an angle θ, with respect to axis Y. In one particular embodiment θ may equal approximately one and one-half degrees. Accordingly, the sharp point 69 of each tooth 62 extends approximately to axis Z.

In another embodiment, teeth 62 may be provided of approximately equal size, and threaded portion 60 may be tapered with respect to central longitudinal axis X. Regardless of how the taper is achieved, tapering sharp points 69 of teeth 62 with respect to central longitudinal axis X allows threaded portion 60 to compress outer diameter 51 of conduit 34 as female connector 40 is coupled with conduit 34, and conduit 34 advances toward protrusion 58.

Interior diameter 52 also includes a compression sealing surface, or land 74. Land 74 is tapered to correspond to axis Z. In one embodiment, land 74 may be tapered at one and one-half degrees with respect to axis Y, corresponding to the taper of teeth 62. Land 74 forms a transition between thread 61 and dead stop 59. The taper of land 74 is operable to compress, or squeeze exterior diameter 51 of conduit 34 in order to form a fluid tight seal therebetween.

At its second end 56, female connector 40 may be adapted to receive another component of a conduit system 30. In one embodiment, as illustrated in FIG. 2, female connector 40 may be adapted to receive a male connector 42, to form a releasable coupling therebetween. In another embodiment, to be discussed later in more detail with respect to FIG. 8, female connector 40 may be adapted to receive a second conduit 138.

Referring now to FIGS. 2 and 2A, female connector 40 includes a plurality of tab locks 80 which extend from protrusion 58 and at least partially form second end 56 of female connector 40. A plurality of slots 82 are disposed between adjacent tab locks 80. Slots 82 provide flexibility to tab locks 80 allowing tab locks 80 to extend radially outwardly, as required when installing female connector 40 upon male connector 42. The number of tab locks 80 required for a particular female connector 40 may be significantly modified within the teachings of the present invention. In the illustrated embodiment of FIGS. 2 and 2A, eight tab locks 80 are provided. The number of tab locks 80 required for each application is a function of the type and rigidity of material used to form conduit coupling 36. The number of tab locks 80 may also be modified corresponding to the strength of the connection desired, and the size of the conduit to be coupled. For example, and not by way of limitation, a one and one quarter inch conduit coupling, may incorporate eight tab locks 80. Similarly, a two-inch conduit coupling may have as many as sixteen or more tab locks 80.

Tab locks 80 include a sealing surface 84, adjacent protrusion 58. Sealing surface 84 is configured to engage a corresponding sealing surface 94, associated with male connector 42 (FIG. 2B). In one embodiment, a gasket 85 may be provided within a radial cavity 95 within sealing surface 94. Alternatively, sealing surface 84 may be configured to engage sealing surface 94 directly, and form a fluid tight seal therebetween. In this embodiment, sealing surface 84 may be tapered to compress sealing surface 94 therein upon engagement between female connector 40 and male connector 42. Similarly, sealing surface 94 may include a corresponding taper, corresponding to the taper of sealing surface 84.

A second tapered surface 86 forms the transition between sealing surface 84 and a plurality of tabs 88. Tapered surface 86 controls the point of flex on the locking tab. The point of flex is the location where tab locks 80 will bend when a radially outward force is applied. The point of flex is a function of the tab thickness, and the amount of deflection required to install female connector 40 upon male connector 42. The point of flex will also determine the amount of force necessary to disengage tab locks 80 from a corresponding shaped cavity 90, associated with male connector 42 (FIG. 2B). Tapered surface 86 also provides a smooth transition between sealing surface 84 and tabs 88, to prevent any sharp edges between these components which may form points of failure causing tabs 88 to fracture unnecessarily.

A plurality of locking lugs 89 extend radially inwardly with respect to tabs 88. Locking lugs 89 are configured to correspond with shaped cavity 90 associated with male connector 42. In the illustrated embodiment, shaped cavity 90 comprises a circumferential groove which extends around the entire perimeter of exterior diameter 150. In another embodiment, shaped cavity 90 may comprise one or more discontinuous partial cavity sections which do not extend around the entire perimeter of male connector 42. The number of tab locks 80, the width of locking lugs 89 disposed thereupon, and the length of shaped cavity 90 allow male connector 42 to be circumferentially secured to female connector 40 over a large surface area. Accordingly, when the male and female connectors 42 and 40, respectively, are mated together, radial conduit coupling 36 can handle high separation loads. In addition, the male and female connectors 42 and 40 can be mated together in any radial configuration. Accordingly, complications during assembly of radial conduit coupling 36 are reduced. When female connector 40 engages male connector 42, locking lugs 89 snap into and reside within shaped cavities 90 and form the releasable coupling between female connector 40 and male connector 42. A radially outward force applied to tab locks 80 may cause tabs 88, and therefore locking lugs 89 to extend radially outwardly, allowing locking lugs 89 to disengage from shaped cavities 90.

The portions of exterior diameter 50 of female connector 40 which include flutes 70 may have an increased thickness with respect to other portions of female connector 40. This increased thickness provides additional strength to female connector 40, and also facilitates greater depth for flutes 70. This prevents portions of exterior diameter 50 from failing when engaged by installation tools. Accordingly, sufficient depth for installation tools to engage the flutes 70 is provided.

Referring now to FIGS. 2 and 2B, male connector 42 generally comprises an elongate, cylindrical, tubular configuration, having an exterior diameter 150, interior diameter 152, and first and second ends 154 and 156, respectively.

The first end 154 of male connector 42 may be coupled with a length of conduit 38 at a threaded portion 160 of first end 154. First end 154 and threaded portion 160 are configured similarly to first end 54 and threaded portion 60 of female connector 40. The coupling between male connector 42 and conduit 38 may be formed in any manner similar to those discussed above with respect to the coupling between female connector 40 and conduit 34. As illustrated in FIG. 2A, male connector 42 includes a single continuous thread 161, which forms a plurality of teeth 162 along interior diameter 152 of male connector 42.

Teeth 162 of male connector 42 are tapered, similar to teeth 62 of female connector 40. Each tooth 162 includes a front face 165 and a rear face 167. Rear face 167 extends generally perpendicular from an axis through the base of each tooth 162. Conversely, front face 165 extends at an angle of approximately thirty degrees with respect to the same axis. This configuration forms a sharp point 169 upon each tooth 162 suitable for gripping conduit 138. The first tooth 162a along threaded portion 160 is smaller than and protrudes less dramatically from interior diameter 152, than does the last tooth 162b. The advantages of this configuration were discussed previously with respect to female connector 40.

Male connector 42 also includes a tapered surface 174 which generally corresponds to the taper established by the sharp points 169 of teeth 162. Tapered surface 174 is operable to compress an exterior diameter 151 of conduit 38, and squeeze conduit 38 therein. This forms a generally fluid type seal between conduit 38 and male connector 42.

Male connector 42 includes a protrusion 158 having a barrier, or dead stop 159 which cooperates with conduit 38 to prevent the lateral movement of conduit 38, with respect to male connector 42, beyond first end 154 of male connector 42. Contact between conduit 38 and dead stop 159 prevents further rotation, and lateral movement of male connector 42 and indicates that male connector 42 is properly installed upon conduit 38. A practitioner may view interior diameter 152 through second end 156, to ensure the proper installation of male connector 42 upon conduit 38, in a similar manner to the above described with respect to conduit 34 and female connector 40. In a particular embodiment, coupling 36 may be fabricated from a translucent material which allows a practitioner to view interior diameters 52 and 152 after the releasable coupling is formed between female connector 40 and male connector 42.

In the embodiment illustrated in FIG. 2, a gasket 172 is provided between conduit 38 and dead stop 159. Gasket 172 provides an enhanced fluid tight seal between conduit 38 and male connector 42. Gasket 172 is not required to form a seal between components. For illustrative purposes, gasket 172 is illustrated in FIG. 2 at the connection between conduit 38 and male connector 42. Another gasket 176 may also be installed in a similar manner between conduit 34 and female connector 40 as illustrated in FIG. 2C.

Alternatively, the compression seal formed between tapered surface 174 and exterior diameter 151 may be sufficient to form the desired fluid tight seal to protect the contents of conduit 38. Any type of gasket, washer seal, or other sealant material may be provided at the connection between conduit 38 and male connector 42 to form this fluid barrier. Similarly, another gasket 173 is illustrated in FIGS. 2 and 2B to enhance the fluid tight seal between exterior diameter 151 and interior diameter 152. Gasket 173 is an optional component of conduit coupling 36. It will be recognized by those of ordinary skill in the art that gasket 173 may be placed at any location between interior diameter 152 and exterior diameter 151 to enhance the fluid tight seal therebetween. Similarly, gasket 72 associated with female connector 40 may be placed at any location between interior diameter 52 and exterior diameter 51.

Male connector 42 also includes a plurality of flutes 170 disposed about exterior diameter 150 of male connector 42. Flutes 170 are designed and configured similar to flutes 70 of female connector 40, to facilitate the installation of male connector 42 upon conduit 38.

Second end 156 of male connector 42 is adapted to receive another component of conduit system 30. In the illustrated embodiment of FIGS. 2 and 2B second end 156 is adapted to receive second end 56 of female connector 40. In another embodiment, second end 156 of male connector 42 may be adapted to receive another conduit which will be described later in more detail with regard to FIG. 8.

Male connector 42 includes a circumferential tapered surface 186 adapted to guide locking lugs 89 of female connection 40 along exterior diameter 150 of male connector 42 until locking lugs 89 engage shaped cavity 90. Shaped cavity 90 is configured to receive locking lugs 89 therein, such that locking lugs 89 will snap into place, and form a releasable coupling between female connector 40 and male connector 42.

Figure 2E:
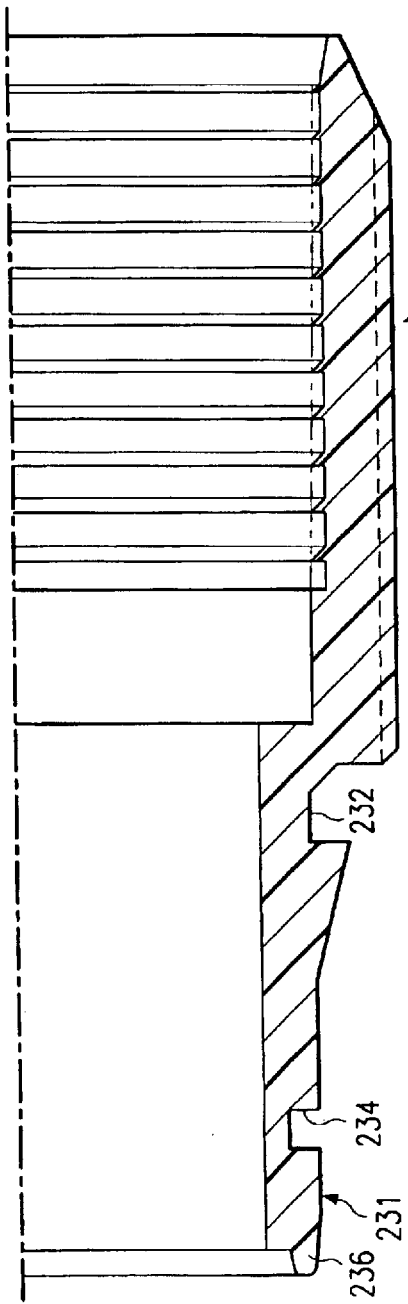
FIG. 2E is a partial cross-section, with portions broken away, illustrating another alternative embodiment connector.

Alternative embodiment female and male connectors are illustrated in FIGS. 2D and 2E, respectively. Female connector 210 is similar to female connector 40 in many respects. Female connector 210 includes a threaded portion 212 adapted to receive a length of conduit (not expressly shown). A plurality of tab locks 214 are disposed about the circumference of female connector 210 at a first end 216. Tab locks 214 are configured to cooperate with circumferential groove 232 associated with male connector 230. A second circumferential groove 234 is disposed about the circumference of male connector 230, and adapted to receive a gasket, or pipe seal (not expressly shown), therein. Female connector 210 and male connector 230 include an additional sealing feature which may also be incorporated into female connector 40 and male connector 42, previously described. Male connector 230 terminates in a bullnose configuration 236 at its first end 231. A protrusion 218 upon an interior diameter 211 of female connector 210 forms a shaped circumferential cavity 219. Cavity 219 is adapted to receive bullnose 236 when female connector 210 is coupled with male connector 230. Bullnose 236 and cavity 219 cooperate to form an enhanced fluid tight seal between female connector 210 and male connector 230. As compressive pressure is exerted upon dead stop 220 of protrusion 218, by a length of conduit, protrusion 218 exerts force upon bullnose 236 at shaped cavity 219, and improves the fluid tight seal between female connector 210 and male connector 230.

Figure 3:
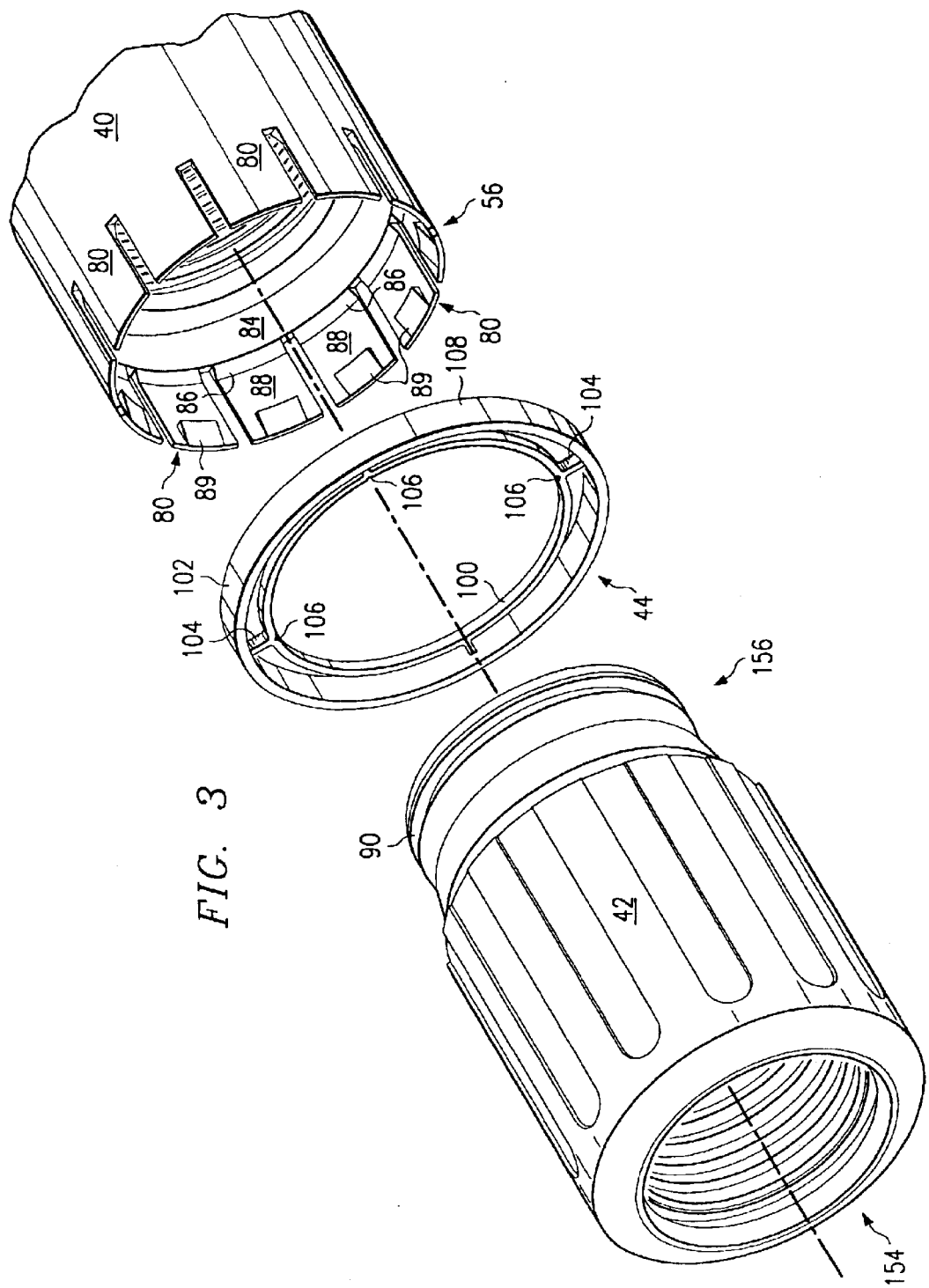
FIG. 3 is an exploded perspective view illustrating additional aspects of the conduit coupling and unlocking mechanism of FIG. 2, in accordance with the teachings of the present invention.

FIGS. 2 and 3 illustrate an unlocking mechanism 44 suitable for use within the teachings of the present invention. Unlocking mechanism 44 may be preinstalled upon female connector 40 prior to coupling female connector 40 with male connector 42, to accommodate the removal of male connector 42 from female connector 40, as desired. Unlocking mechanism 44 generally comprises a cylindrical, tubular configuration and includes an inner ring 100, and outer ring 102 and a plurality of radial braces 104 which couple inner ring 100 and outer ring 102.

Radial braces 104 are configured to engage slots 82 such that unlocking mechanism 44 may be installed upon exterior diameter 50 of female connector 40 at its second end 56. In addition, radial braces 104 of unlocking mechanism 44 are configured to fit, and move laterally within slots 82. Unlocking mechanism 44 may therefore be installed onto female connector 40 in any suitable radial orientation without affecting the operation of unlocking mechanism 44. Outer ring 102 is slidably disposed about exterior diameter 50, in its installed position. Conversely, inner ring 100 is disposed about interior diameter 52 of female connector 40. When male connector 42 is coupled with female connector 40, inner ring 100 is disposed about exterior diameter 150 of male connector 42.

In order to decouple male connector 42 from female connector 40, a practitioner may slide unlocking mechanism 44 longitudinally along central axis X in a direction toward conduit 38. As inner ring 100 slides along sealing surface 94 and tapered surface 186, a plurality of expansion joints 106 associated with inner ring 100 allow inner ring 100 to expand radially outwardly. As inner ring 100 climbs tapered surface 186 of male connector 42, inner ring 100 imposes a force upon tabs locks 80 radially outwardly. As tabs 88 and locking lugs 89 expand outward, locking lugs 89 are disengaged from shaped cavity 90 and male connector 42 is free to be slidably removed from female connector 40. Unlocking mechanism 44 may also include a rough friction surface 108 disposed about at least a portion of the exterior diameter of outer ring 102. Friction surface 108 provides a gripable surface to facilitate ease of maneuverability of unlocking mechanism 44.

In the illustrated embodiment, unlocking mechanism 44 comprises four radial braces 104. It will be understood that the number of radial braces 104 may be suitably varied to change the degree of structural support between inner ring 100 and outer ring 102. For example, additional radial braces may be used to increase the structural support between inner and outer rings 100 and 102, respectively.

One advantage of the present invention includes the maneuverability and freedom of movement of female connector 40 with respect to male connector 42, in their assembled position. After the releasable coupling is formed between female connector 40 and male connector 42 each component maintains complete mobility of axial rotation with respect to the other component. For example, even in an assembled position with male connector 42, female connector 40 may be freely rotated and installed upon, or removed from conduit 34. Female connector 40 maintains this freedom of mobility with respect to male connector 42 when unlocking mechanism 44 is installed upon female connector 40. This provides many advantages for enhanced maneuverability of all components of conduit system 30 during installation, maintenance, and/or repair of female connector 40, male connector 42, unlocking mechanism 44, conduits 34 and 38, and any components installed within conduits 34 and 38. Similarly, even in their assembled position, female connector 40 and male connector 42 may be either independently or collectively unscrewed from or screwed upon a conduit. This allows a practitioner to form the releasable coupling between female connector 40 and male connector 42 prior to completely installing (and threading) conduits 34 and/or 38.

Figure 4:
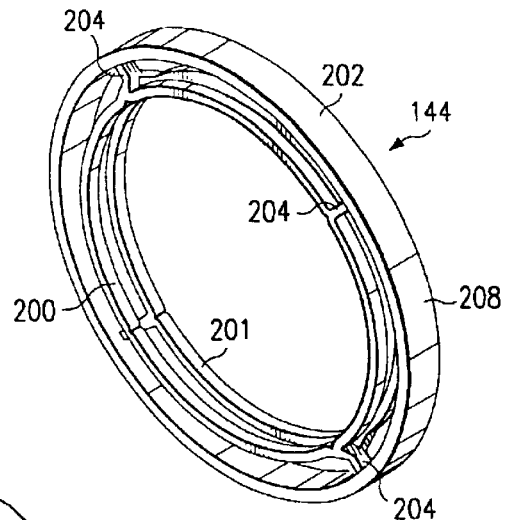
FIG. 4 is a perspective view, illustrating an unlocking mechanism in accordance with another embodiment of the present invention.

An alternative embodiment unlocking mechanism 144, suitable for use within the teachings of the present invention, is illustrated in FIG. 4. Unlocking mechanism 144 includes an outer ring 202 and a plurality of inner rings 200 and 201. A number of Y-shaped radial braces 204 provide a flexible coupling between inner rings 200 and 201, and outer ring 202. Radial braces 204 are configured to engage slots 82 of female connector 40 to allow unlocking mechanism 144 to be preinstalled upon female connector 40. After installing unlocking mechanism 144 upon female connector 40, male connector 42 may be releasable coupled with female connector 40. Inner ring 200 operates in a manner similar to the operation of inner ring 100 as discussed with reference to FIG. 3. The deflection of outer ring 202 radially inward by squeezing outer ring 202 causes inner ring 200 to move laterally relative to the inner ring 201. In order to decouple male connector 42 and female connector 40 a practitioner can exert a compressive, radially inward force upon outer ring 202. Flexible braces 204 are forced inward and inner rings 200 and 201 are forced apart. Inner rings 200 and 201 are disposed between interior diameter 52 of female connector 40 and exterior diameter 150 of male connector 42. As inner ring 200 and 201 are forced apart from each other, inner ring 200 is forced along sealing surface 94 and tapered surface 186 of male connector 142. Inner ring 200 imposes a radial outward force upon tab locks 80, forcing tabs 88 and locking lugs 89 radially outward. As locking lugs 89 extend outward, locking lugs 89 disengage from shaped cavity 90, and male connector 42 may be slidably removed from female connector 40. Unlocking mechanism 144 may also include a friction surface 208 disposed about the exterior perimeter of outer ring 202. Friction surface 208 accommodates ease of maneuverability of unlocking mechanism 144.

Figure 5:
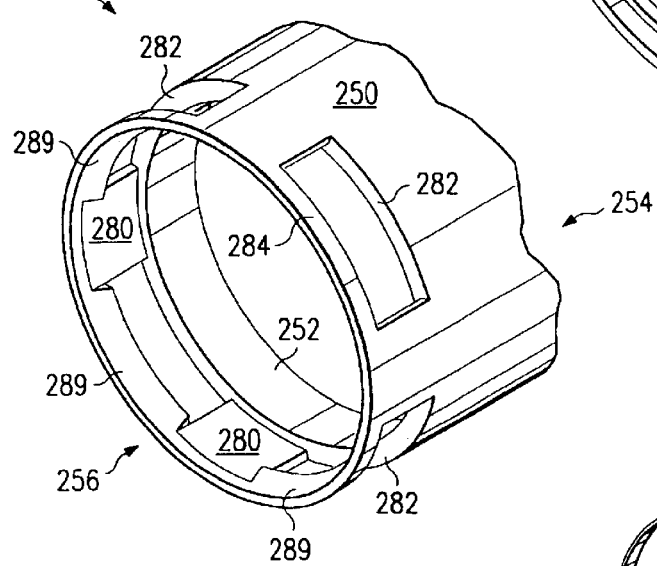
FIG. 5 is a perspective view illustrating a female radial connector in accordance with another embodiment of the present invention.

An alternative embodiment female connector 240 is illustrated in FIG. 5. Female connector 240 includes an exterior diameter 250, an interior diameter 252, and first and second ends 254 and 256, respectively. First end 254 of female connector 240 may be configured similar to first end 54 of female connector 40.

Second end 256 includes a plurality of locking lugs 289 disposed about interior perimeter 252. In lieu of a plurality of independent tab locks 80 similar to female connector 40 (See FIG. 2), female connector 240 includes a plurality of segmented tabs 280, which are disposed between a plurality of segmented slots 282. Segmented slots 282 extend along outer diameter of second end 256 and form a continuous ring 284 along first end 256. Segmented slots 282 provide flexibility to second end 256 to allow interior diameter 252 to be disposed about an exterior diameter of a male connector, similar to male connector 42. Accordingly, locking lugs 289 engage a shaped cavity 90 associated with male connector 42 and provide a releasable coupling therebetween. In practice, female connector 240 may be used for applications in which a semi-permanent connection is desired between female connector 240 and male connector 42.

Figure 6:
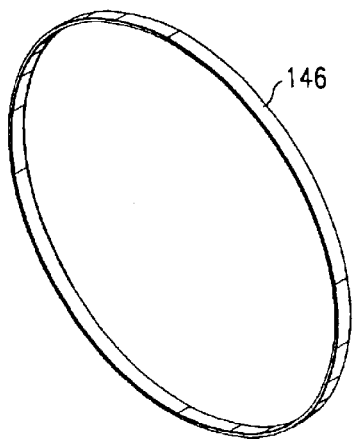
FIG. 6 is a perspective view, illustrating a lock ring, suitable for use within the teachings of the present invention.

FIG. 6 illustrates a lock ring 146, suitable for use within the teachings of the present invention. Lock ring 146 may be installed in lieu of unlocking mechanism 44, upon female connector 42 of FIG. 2. Lock ring 146 may be installed about the circumference of female connector 40 to provide additional strength to the connection between female connector 40 and male connector 42. In practice, lock ring 146 may be preinstalled about exterior diameter 50 of female connector 40 at its second end 56, prior to forming the releasable coupling between female connector 40 and male connector 42. For example, lock ring 146 may be installed immediately adjacent and surrounding each tapered surface 86 (FIG. 2B). When the releasable coupling is formed between female connector 40 and male connector 42, lock ring 146 may be slidably moved longitudinally toward conduit 38, to a location adjacent and surrounding tabs 88. Lock ring 146 may be sized to prevent tabs 88 from extending radially outwardly, when lock ring 146 is in an installed position. In order to decouple female connector 40 from male connector 42, lock ring 146 must be slidably moved longitudinally toward conduit 34, back to approximately its initial position.

Lock ring 146 may be suitable for applications in which significant lateral tensile, and axial compressive forces are anticipated upon conduit coupling 36. For example, lock ring 146 may be appropriate in order to install conduits 34 and 38 using a plowing type installation. Plowing is often utilized for the installation of telecommunications ducts. A special plow may be employed to cut the ground open and simultaneously force duct into the ground from a chute, which may be mounted to the plow. As conduit is fed to the chute, from a reel, which may be mounted to a trailer, or to the plow. Conduits forming the duct are forced underground. When the end of a reel of conduit is reached, the reel of conduit must be coupled with a second reel of conduit using, for example, coupling 36 of the present invention. As coupling 36 is bent around the chute, it experiences significant lateral tensile and axial compressive forces. Lock ring 146 prevents the inadvertent decoupling, or failure of the connection between female connector 40 and male connector 42, for this type of application. Lock ring 146 may be fabricated from various types of metal, plastics, and composite materials. Any strap, or ring of material suitable to withstand anticipated tensile and axial compressive forces is suitable for use within the teachings of the present invention.

Figure 7:
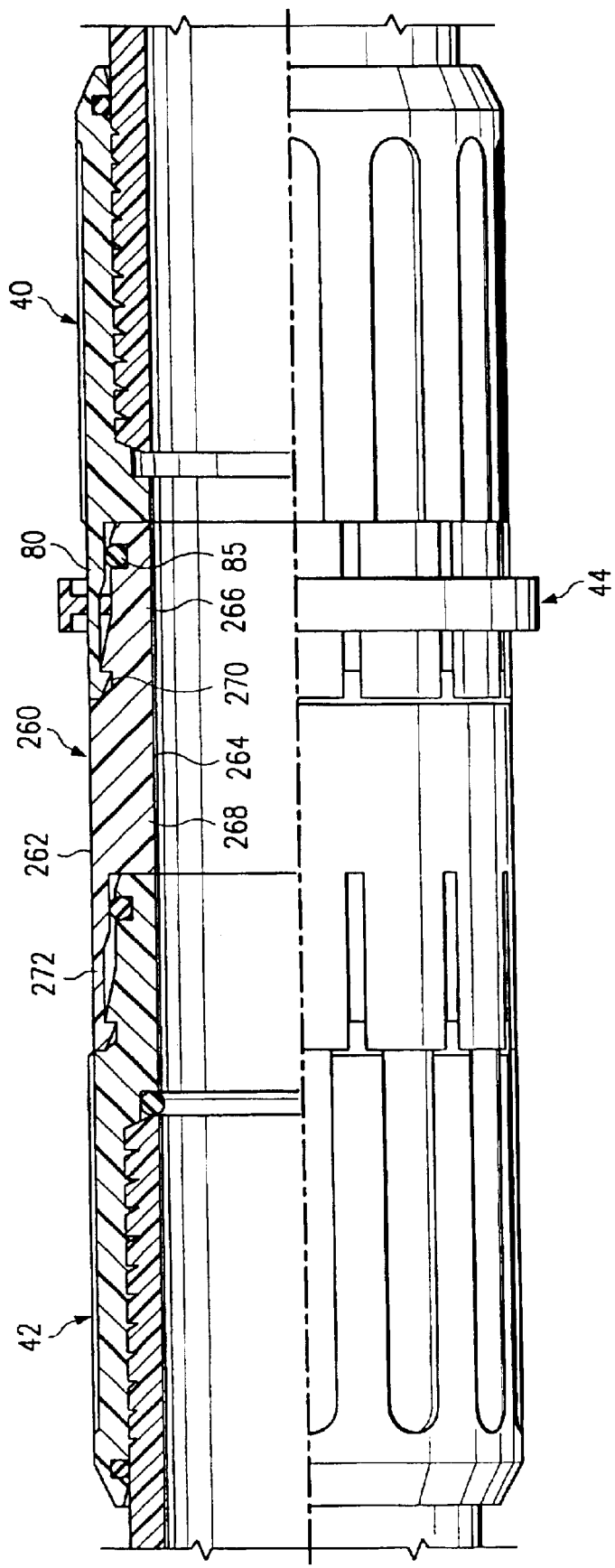
FIG. 7 is a schematic drawing in section, with portions broken away, illustrating an alternative embodiment conduit coupling, within the teachings of the present invention.

An extension coupling 260, suitable for use within the teachings of the present invention, is illustrated in FIG. 7. Extension coupling 260 includes an exterior diameter 262 and an interior diameter 264, and first and second ends 266 and 268, respectively. Interior diameter 264 is configured to provide radial continuity to conduit system 30, similar to interior diameter 64 of protrusion 58, of female connector 40 (see FIG. 2). At its first end 266, extension coupling 260 is configured to form a releasable coupling with female connector 40. Accordingly, extension coupling 260 includes a shaped cavity 270 configured to receive tab lock 80 of female connector 40. An unlocking mechanism may also be installed upon female connector 40 prior to forming the releasable coupling with extension coupling 260. A gasket 85 may also be incorporated in order to provide an enhanced fluid tight seal between female connector 40 and extension coupling 260.

At is second end 268, extension coupling 260 is configured to form a releasable coupling with a male connector 42. Accordingly, extension coupling 260 incorporates a plurality of tab locks 272, similar to tab locks 80 of female connector 40. Although not illustrated in FIG. 8, a second unlocking mechanism may be preinstalled upon extension coupling 260 prior to forming the releasable coupling between extension coupling 260 and male connector 42. This unlocking mechanism may function similarly to unlocking mechanism 44 of female connector 40, to facilitate decoupling of extension coupling 260 from male connector 42, as required. Alternatively, one or more lock rings 146 (FIG. 6) may be incorporated in lieu of the unlocking mechanisms, to provide enhanced strength to the connections between extension coupling 260 and female connector 40 and male connector 42, respectively. Various other components associated with female connector 40 and male connector 42 may function similarly to those described within this specification.

Extension coupling 260 may be advantageous in situations where sections of conduit must be cut in order to perform maintenance and/or repairs. Extension coupling 260 may be incorporated between any female connector 40 and male connector 42 to increase the overall length of conduit coupling 36, as required. Extension coupling 260 may also facilitate repairs in situations where a conduit is cut too short, to otherwise form a suitable coupling between lengths of conduit.

Figure 8:
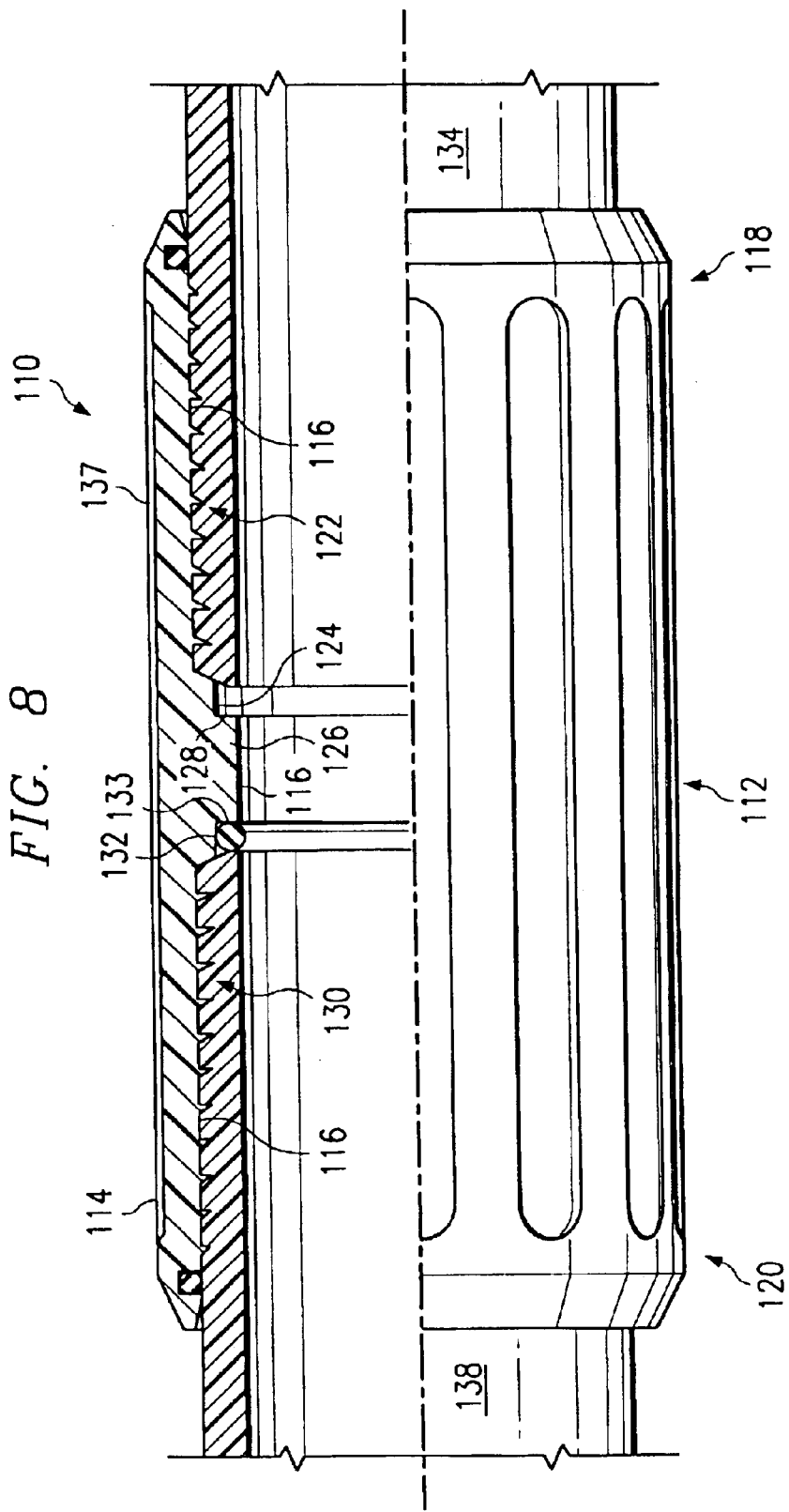
FIG. 8 is a schematic drawing in section, with portions broken away, illustrating another alternative embodiment of the conduit coupling of FIG. 2.

Referring to FIG. 8, an alternative embodiment conduit coupling 110 is provided. Conduit coupling 110 comprises a one-piece conduit coupling in lieu of the two-piece coupling of FIG. 2. Conduit coupling 110 comprises a single connector 112. Connector 112 includes an elongate, cylindrical, tubular configuration, having an exterior diameter 114, an interior 116, and first and second ends 118 and 120, respectively. The profile of interior diameter 116 varies across the longitudinal cross section from first end 118 to second end 120. First end 118 of connector 112 is very similar to first end 54 of female connector 40. First end 118 is adapted to receive, and maybe coupled with, a length of conduit 134. Connector 112 includes a threaded portion 122, a land 124, a protrusion 126, and a dead stop 128, which function similarly to like components described previously herein.

Second end 120 of connector 112 is similar to first end 154 of male connector 42 of FIG. 2. Also, first end 120 is a virtual mirror image of first end 118. First end 120 includes a threaded portion 130, a land 132, and a second dead stop 133 associated with protrusion 126. Threaded portion 130 includes reverse threads with respect to threads associated with threaded portion 122. Conduit coupling 110 may be incorporated into a conduit system suitable for one-piece conduit couplings. In order to install conduit coupling 110 upon conduits 134 and 138, conduit 134 may be placed adjacent first end 118, and conduit 138 may be placed adjacent second end 120. Conduit coupling 110 may then be rotated in a manner such that threaded portions 122 and 130 draw conduits 134 and 138, respectively, toward protrusion 126, until conduits 134 and 138 contact dead stops 128 and 133, respectively. Conduit coupling 110 also includes a plurality of flutes 137, which function similarly to flutes 70 associated with female connector 40.

Although the snap type coupling described with respect to FIG. 2 illustrates a linear coupling, the teachings of the present invention may be incorporated into an entire fitting system including Ts 36a and elbows 36b (FIG. 1), and any other type of fitting. For example, a T shaped conduit may be provided with three conduit branches in lieu of the two branch conduit system illustrated herein. A female connector 40 may be installed upon each of the three branches of the T fitting, in order to form a releasable coupling with three sections of conduit. Similarly, male connectors 42 may be installed upon each of three sections of conduit to be coupled with each branch of the T-shaped fitting. Connections between each of the three female connectors 40 and three male connectors 42 may be made as described within this specification. Conversely, in an alternative embodiment, male connectors 42 may be installed upon each branch of the T-shaped fitting, and female connectors 40 may be installed upon each of three lengths of conduit. The teachings of the present invention may be incorporated into any other configuration of fitting, for example, ninety and forty-five degree elbows.

Conduits 34 and conduit couplings 36 of the present invention may be incorporated universally into existing conduit systems. Accordingly, conduits 34 and couplings 36 of the present invention may be incorporated into concrete encased outer duct and piping systems, as well as metal duct runs. Conduit 34 and couplings 36 may be exposed to ambient environmental conditions both indoors and outdoors, and may be provided with associated insulation or other protection, as required. Similarly, conduits 34 and couplings 36 may be installed above ground and below ground, with or without insulation or other forms of protection.

In one embodiment of the present invention, a nonmetallic high modulus plastic may be incorporated into the components of conduit coupling 36 to provide long lasting installation in corrosive environments. Translucent plastics or composites may also be incorporated into conduit couplings 36 in order to provide a mechanism for visual confirmation that both ends of conduits 34 and 38 are appropriately installed upon their respective female and male connectors 40 and 42, respectively.

The teachings of the present invention provide significant advantages for the installation of conduit systems 30. For example, female connectors 40 and/or male connectors 42 may be preinstalled upon lengths of conduit during manufacture. This provides for simplified field installation saving time and money during the installation process. Alternatively, female connectors 40 and/or male connectors 42 may be preinstalled upon lengths of conduit 34 and/or 38 in the field, prior to installation of conduit system 30. Accordingly, enhanced speed and accuracy may be accomplished in an assembly-line style installation process.

Although the present invention has been described in several embodiments, various changes and modifications may be suggested to one skilled in the art. It is intended that the present invention encompasses such changes and modifications that fall within the scope of the appended claims.

What is claimed is:

1. A conduit coupling, comprising:
    an elongate, tubular first connector for installation upon a first conduit, the first connector having first and second ends, and an interior surface configured to receive the first conduit;
    a threaded portion disposed upon the interior surface adjacent the first end of the first connector and operable to releasably couple the first connector and the first conduit;
    the threaded portion being tapered with respect to a central longitudinal axis of the first connector;
    a protrusion extending from the interior surface and forming first and second barriers, the first barrier operable to prevent lateral movement of the first conduit, with respect to the first connector, beyond the first barrier;
    the second end adapted to receive a component of a conduit system;
    the second barrier operable to prevent lateral movement of the component, with respect to the first connector, in a direction toward the first conduit;
    a plurality of teeth associated with the threaded portion, each tooth having a point disposed thereupon; and
    the teeth configured such that an axis through the point of each tooth is tapered with respect to a central longitudinal axis of the conduit coupling.

2. The conduit coupling of claim 1, further comprising:
    a sealing surface disposed between the threaded portion and the protrusion; and
    the sealing surface operable to cooperate with an exterior surface of the first conduit to form a generally fluid tight seal therebetween.

3. The conduit coupling of claim 2, wherein the sealing surface is tapered and operable to compress the exterior surface of the first conduit as the first conduit is threadably installed within interior surface.

4. The conduit coupling of claim 3, wherein the sealing surface is tapered at approximately one and one-half degrees with respect to a central longitudinal axis of the conduit coupling.

5. The conduit coupling of claim 1, wherein the threaded portion is tapered with respect to a central longitudinal axis of the conduit coupling, such that the threaded portion is operable to compress the exterior diameter of the first conduit as the first conduit is forced toward the protrusion.

6. The conduit coupling of claim 1, wherein the axis through the point of each tooth is tapered at an angle of approximately one and one-half degrees with respect to the central longitudinal axis.

7. The conduit coupling of claim 1, wherein the component of the conduit system comprises an elongate, tubular second connector.

8. The conduit coupling of claim 7, further comprising:
    a plurality of tab locks extending from the second end of the first connector and having corresponding slots separating adjacent tab locks;
    at least one of the plurality of tab locks including a locking lug disposed upon and extending from the interior surface of the first connector; and
    the locking lug configured to cooperate with at least one shaped cavity disposed upon an exterior surface of the second connector, and operable to form a releasable coupling between the first and second connectors.

9. The conduit coupling of claim 7, further comprising:
    at least one locking lug disposed upon the interior surface of the first connector at its second end;
    a plurality of segmented tabs, separating a plurality of segmented slots, disposed upon the exterior surface to provide flexibility to the second end of the first connector; and
    the locking lug configured to cooperate with at least one shaped cavity disposed upon an exterior surface of the second connector, and operable to releasably couple the first and second connectors.

10. The conduit coupling of claim 1, wherein at least a portion of the conduit coupling comprises a translucent material to allow a visual inspection of an interior surface of the conduit coupling when the conduit coupling is in an assembled position.

11. The conduit coupling of claim 1, wherein an interior diameter of the protrusion generally corresponds with interior diameters of the first and second lengths of conduit, to maintain a generally uniform interior diameter throughout the first and second conduits and the conduit coupling.

12. A conduit coupling, comprising:
    an elongate, tubular first connector for installation upon a first conduit, the first connector having first and second ends, and an interior surface configured to receive the first conduit;
    a threaded portion disposed upon the interior surface adjacent the first end of the first connector and operable to releasably couple the first connector and the first conduit;
    the threaded portion being tapered with respect to a central longitudinal axis of the first connector;
    a protrusion extending from the interior surface and forming first and second barriers, the first barrier operable to prevent lateral movement of the first conduit, with respect to the first connector, beyond the first barrier;

the second end adapted to receive a component of a conduit system;

the second barrier operable to prevent lateral movement of the component, with respect to the first connector, in a direction toward the first conduit; and wherein the threaded portion further comprises:
a continuous first thread extending along at least a portion of the interior surface adjacent the first end;
the first thread comprising a first face and a second face extending from a base of the first thread and joined at a sharp point;
the rear face disposed approximately perpendicular to a longitudinal axis through the base of the first thread; and
the front face disposed at an angle greater than five degrees with respect to the axis.

13. A conduit coupling, comprising:
an elongate tubular first connector for installation upon a first conduit, the first connector having first and second ends, and an interior surface configured to receive the first conduit;
a threaded portion disposed upon the interior surface adjacent the first end of the first connector and operable to releasably couple the first connector and the first conduit;
the threaded portion being tapered with respect to a central longitudinal axis of the first connector;
a protrusion extending from the interior surface and forming first and second barriers, the first barrier operable to prevent lateral movement of the first conduit, with respect to the first connector, beyond the first barrier;
the second end adapted to receive a component of a conduit system;
the second barrier operable to prevent lateral movement of the component, with respect to the first connector, in a direction toward the first conduit; and
wherein the component of the conduit system comprises a second conduit and the second end of the first conduit further comprises a second threaded portion disposed upon the interior surface of the first connector at its second end, and operable to couple the first connector and the second conduit.

14. The conduit coupling of claim 13, further comprising a plurality of flutes disposed upon an exterior diameter of the first connector and operable to provide a gripping surface.

15. A conduit coupling comprising:
an elongate, tubular first connector for installation upon a first conduit, the first connector having first and second ends, and an interior surface configured to receive the first conduit;
a threaded portion disposed upon the interior surface adjacent the first end of the first connector and operable to releasably couple the first connector and the first conduit;
the threaded portion being tapered with respect to a central longitudinal axis of the first connector;
a protrusion extending from the interior surface and forming first and second barriers, the first barrier operable to prevent lateral movement of the first conduit, with respect to the first connector, beyond the first barrier;
the second end adapted to receive a component of a conduit system;
the second barrier operable to prevent lateral movement of the component, with respect to the first connector, in a direction toward the first conduit;
wherein the component of the conduit system comprises a second conduit and the second end of the first conduit further comprises a second threaded portion disposed upon the interior surface of the first connector at its second end, and operable to couple the first connector and the second conduit; and
wherein the second threaded portion includes reverse threads, with respect to threads associated with the first threaded portion.

16. A conduit coupling comprising:
an elongate, tubular first connector for installation upon a first conduit, the first connector having first and second ends, and an interior surface configured to receive the first conduit;
a threaded portion disposed upon the interior surface adjacent the first end of the first connector and operable to releasably couple the first connector and the first conduit;
the threaded portion being tapered with respect to a central longitudinal axis of the first connector;
a protrusion extending from the interior surface and forming first and second barriers, the first barrier operable to prevent lateral movement of the first conduit, with respect to the first connector, beyond the first barrier;
the second end adapted to receive a component of a conduit system;
the second barrier operable to prevent lateral movement of the component, with respect to the first connector, in a direction toward the first conduit;
wherein the component of the conduit system comprises an elongate, tubular second connector;
the second connector having first and second ends, and an interior surface configured to receive an exterior surface of the second conduit;
a second threaded portion disposed upon the interior surface of the second connector adjacent its first end and operable to releasably couple the second connector and the second conduit; and
wherein the second connector further comprises a second protrusion extending from the interior surface of the second connector and forming a second barrier to prevent lateral movement of the second conduit, with respect to the second connector, beyond the first end of the second connector.

17. A conduit coupling, comprising:
an elongate, tubular first connector for installation upon a first conduit, the first connector having first and second ends, and an interior surface configured to receive the first conduit;
a threaded portion disposed upon the interior surface adjacent the first end of the first connector and operable to releasably couple the first connector and the first conduit;
the threaded portion being tapered with respect to a central longitudinal axis of the first connector;
a protrusion extending from the interior surface and forming first and second barriers, the first barrier operable to prevent lateral movement of the first conduit, with respect to the first connector, beyond the first barrier;
the second end adapted to receive a component of a conduit system;

the second barrier operable to prevent lateral movement of the component, with respect to the first connector, in a direction toward the first conduit;

wherein the component of the conduit system comprises an elongate, tubular second connector;

the second connector having first and second ends, and an interior surface configured to receive an exterior surface of the second conduit;

a second threaded portion disposed upon the interior surface of the second connector adjacent its first end and operable to releasably couple the second connector and the second conduit; and wherein the second connector further comprises at least one shaped cavity upon an exterior surface of the second connector configured to cooperate with a tab lock associated with the first connector and operable to releasably couple the first and second connectors.

18. The conduit coupling of claim 17, further comprising a lock ring disposed along an exterior surface of the tab lock and operable to secure the locking lug at least partially within the shaped cavity when the lock ring is in an installed position.

* * * * *

UNITED STATES PATENT AND TRADEMARK OFFICE
CERTIFICATE OF CORRECTION

PATENT NO. : 6,851,726 B2  Page 1 of 1
APPLICATION NO. : 10/328079
DATED : February 8, 2005
INVENTOR(S) : John T. Minemyer It is certified that error appears in the above-identified patent and that said Letters Patent is hereby corrected as shown below:

Column 17, line 40, "first conduit" should be --first connector--.

Column 18, line 2, "first conduit" should be --first connector--.

Signed and Sealed this

Twenty-ninth Day of April, 2008

JON W. DUDAS
*Director of the United States Patent and Trademark Office*